(12) United States Patent  (10) Patent No.: US 8,423,849 B2
Qin et al.  (45) Date of Patent: Apr. 16, 2013

(54) DEVICE TEST DATA REUSE FOR DEVICE SIMULATION

(75) Inventors: Zhihong Qin, San Diego, CA (US);
Brian H. Kelley, San Diego, CA (US);
Mahesh Moorthy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1083 days.

(21) Appl. No.: 12/380,193

(22) Filed: Feb. 25, 2009

(65) Prior Publication Data

US 2010/0217578 A1  Aug. 26, 2010

(51) Int. Cl.
*G06F 9/455* (2006.01)
(52) U.S. Cl.
USPC .............................................. 714/741; 710/65
(58) Field of Classification Search .................... 717/135
See application file for complete search history.

(56) References Cited

U.S. PATENT DOCUMENTS

| 5,974,248 | A | * | 10/1999 | Graef | 703/22 |
| 6,922,704 | B2 | * | 7/2005 | Frolich et al. | 1/1 |
| 2005/0193036 | A1 | | 9/2005 | Phillips et al. | |

OTHER PUBLICATIONS

Anonymous:"Error on running multiple screen" [Online May 16, 2005, XP002583468, All about Symbian Forums Retrieved from the Internet: URL: http://www.allaboutsymbian.com/forum/showthread.php"t=37325> [retrieved on May 21, 2010] the whole document.
Edwards L. et al., "Developing Series 60 Applications: A Guide for Symbian OS C++ Developers", Mar. 1, 2004, XP002583467, ISBN: 0321227220, pp. 5, 6, 47-48, p. 5-p. 6, p. 47-p. 48, Addison-Wesley Professional.
International Search Report and Written Opinion—PCT/US2010/025428—ISA/EPO—Jun. 21, 2010.

* cited by examiner

*Primary Examiner* — Don Wong
*Assistant Examiner* — Deric Ortiz
(74) *Attorney, Agent, or Firm* — James T. Hagler

(57) ABSTRACT

A method and system reuse data logs generated from testing of programmable devices in order to provide an input file of parameter values and settings for use in automatically configuring a device simulator. The programmable device testing process generates a data log output with data formatted so that parameter data are associated with unique variable labels. The data log output file is processed in a parser operation that filters out private and unnecessary information, organizes the data and generates a simulation input file in a format compatible with the simulator. The process can be fully automated.

20 Claims, 3 Drawing Sheets

DEVICE TEST DATA REUSE FOR DEVICE SIMULATION

COMPUTER PROGRAM LISTING

This application includes a computer program listing appendix submitted on one compact disc. The one compact disc includes three files entitled Test_Output_File.txt (created Sep. 30, 2008; 51 KB), Log_Parser_Code.txt (created Oct. 7, 2008; 27 KB), and Sim_Input_File.txt (created Oct. 7, 2008; 40 KB). The entire contents of the compact disc containing the computer program listing appendix are hereby incorporated by reference.

FIELD OF THE INVENTION

The present invention relates generally to computer systems and more particularly to testing and simulation of software in programmable devices.

BACKGROUND

Testing of software and components is key to ensuring reliable functioning of programmable devices such as cellular telephones. During the process of designing and developing an embedded or programmable device, many tests are executed on the device with its embedded operating software to verify device characteristics, functionality, performance, security, error handling capability etc. After testing, the test data are typically of no further use. Ordinarily the compatibility of embedded and operating system software is confirmed by device testing of prototype units. Once proper operation of embedded software and operating system functions are confirmed for a new device, a software build may be released to the programmable device original equipment manufacturer (OEM) for inclusion in their products. At the same time the confirmed software build may be released to application developers so they can adapt old application to and write new applications for the soon-to-be-released new programmable device.

Application developers also need to test their applications on programmable devices before they are released commercially. Also applications may need to be certified for compatibility with the new programmable devices and the operating system by a certifying authority. However, production devices may not be available for use in such testing when the applications are finished. Therefore, application developers and certifying authorities often perform compatibility testing of applications using a simulator. Also, device simulator platforms provide better debugging and development tools than the devices themselves. Such simulators may operate on a standard computer that is configured with a simulation program to emulate the functionality of the programmable device. Simulators are typical general in structure with the specific device characteristics, settings and operating parameters provided as input values. Thus, to conduct a simulated test of a programmable device, the tester must enter an extensive list of parameter values and settings.

SUMMARY

Various embodiments process data logs generated from operating system testing of programmable devices in order to generate an input file of parameter values and settings which can be used to automatically configure a device simulator. The programmable device testing process generates a data log output with data formatted so that parameter data are associated with unique variable labels. The data log output file is processed by a parser operation that filters out private and unnecessary information, organizes the data and generates a simulator input file in a format compatible with the simulator.

BRIEF DESCRIPTION OF THE DRAWINGS

The accompanying drawings, which are incorporated herein and constitute part of this specification, illustrate exemplary embodiments of the invention. Together with the general description given above and the detailed description given below, the drawings serve to explain features of the invention.

DETAILED DESCRIPTION

Figure 1:
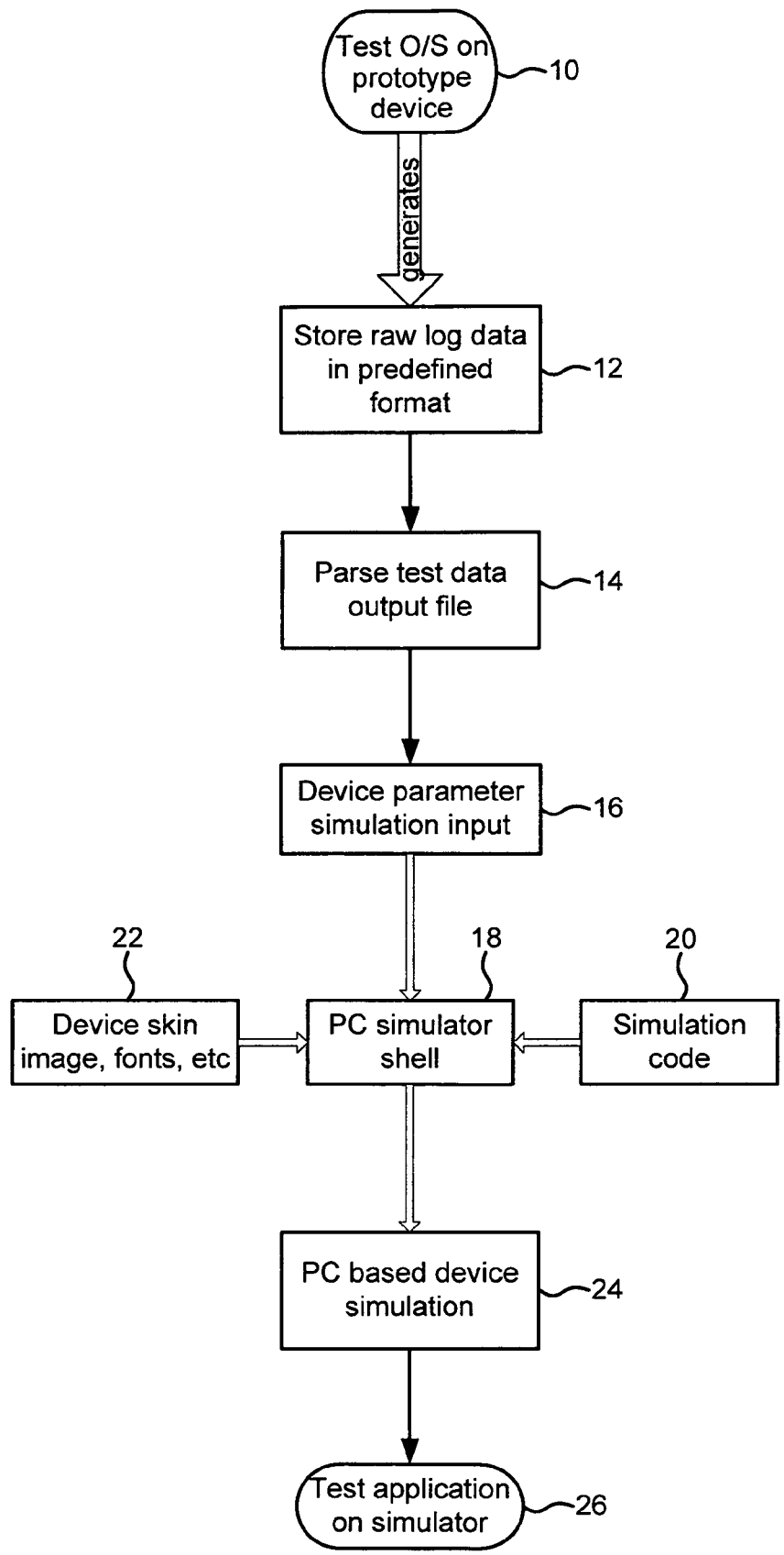
FIG. 1 is a process flow diagram showing a method for porting device test data into a simulator for testing applications.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

As used herein, the terms "programmable device" or "device" refer to any one or all of personal computers, notebook computers, cellular telephones, personal data assistants (PDA's), palm-top computers, wireless electronic mail receivers and cellular telephone receivers (e.g., the Blackberry® and Treo® devices), multimedia Internet enabled cellular telephones (e.g., the iPhone®), and similar personal electronic devices which include memory and a programmable processor that is configured with an operating system and application software.

As used herein, the term "computer" refers to any of personal computers ("PC"), notebook computers, workstations, palm-top computers and the like without distinction. A typical computer will include the components described below with reference FIG. 3 and is configurable with application software.

Conventionally, application developers who desire to test their applications on a computer-based device simulator must enter an extensive list of parameter values and settings. This data entry file is typically manually generated, which is a time consuming and error prone process involving as many as 700 separate parameter entries. Such parameter entries specify each of the system, capability and operating settings of the device. All parameter values must be accurately entered in order to fully characterize the device being simulated. For example, to characterize the display of a simulated device, the input file may have to specify the size of the screen, the number of pixels in the horizontal direction, the number of pixels in the vertical direction, whether the display is color or black & white, and the color depth of the display. If an error is made in the simulation input file, the simulation testing of an application may be misleading or invalid.

The various embodiments enable streamlining of the device simulation process by generating a device simulation input file of parameter values and settings based on the data logs generated during operating system testing of the programmable device. The programmable device testing process generates a test data log output file which presents the test data in a format that links parameter data with unique parameter variable labels. The test data log file is then processed by a parser operation that filters out private and unnecessary information and generates a simulator input file in a format compatible with the simulator. This simulator input file then can be inputted into a simulator system. A set of application programming interfaces (APIs) may be provided for the simulator system to read the simulator input file. By automating the simulator input file generation based upon the output generated by the programmable device itself, better and more affordable simulator testing of applications can be accomplished.

The embodiments define a logging framework for implementation on device test suites that can be recognized and parsed by an associated post processing program, which is referred to herein as a parser processing program. The logging framework in device test suites (or any other device application) is configured so the output log file format is pre-defined and contains certain keyword based name-value pairs. The name-value pairs contain the device's characteristics, parameters, settings and specifications. A post processing program accepts the output log file as input, removes excess information (e.g., private info), parses the log and extracts keyword based name-value pairs, organizes the name-value pairs in a structure that is compatible with the simulator, and stores the processed parameter values in an output file in a predefined format suitable for use as a simulation input file. The simulation input file produced by the post processing program may be in an XML file format. The output from the post processing program can thus be used as an input to a common PC computer simulator shell. The simulator shell reads in the simulation input file containing the device parameter values and then simulates the device's functionality in combination with an application being tested. Input of the simulation input file into the simulator shell may be facilitated by a set of API's that can process the file format. This approach can be fully automated.

An embodiment method for reusing device test data to generate a simulation input file is illustrated in FIG. 1. As a first step, a programmable device with embedded software, such as an operating system, is tested to confirm its functionality and the compatibility of the embedded software with the hardware, step 10. This testing involves operation of the actual device hardware with the embedded software. During testing, the programmable device may be connected to test monitoring equipment (e.g., a computer), which can receive and store test result data in a test data log. Alternatively, the programmable device may be tested in a stand-alone configuration with test result data being stored in memory for later download to a computer.

The test framework, be it in the software implemented in the program mobile device being tested or in the test support equipment, generates a test data log in a predefined format that is stored as a test data log file, step 12. In a preferred embodiment, the test data log file predefined format presents test result parameter values in a name-value format. The name associated with each value is for a variable which uniquely identifies the parameter value. For example, the value for the maximum number of UDP sockets enabled by the programmable device might be identified by the unique name "IDS_DD_DATA_MAX_UDP." As another example, the number of pixels in the primary display screen in the width and height dimensions might be identified by the unique names "IDS_DD_DISPLAY_LCD1_X" and "IDS_DD_DISPLAY_ LCD1_Y." Then the test result data log may include the line "IDS_DD_DATA_MAX_UDP:4" to indicate that the maximum number of UDP sockets is equal to 4. Similarly, the test data log file may include the lines "IDS_DD_DISPLAY_LCD1_X:150" and "IDS_DD_DISPLAY_LCD1_Y:200" to indicate that the device display contains 150×200 pixels. The test data log file may also include other information related to the device, the test results (e.g., "success" or "failed") and comments useful to equipment testers. For example, the portion of the test data log file relating to the UDP sockets may include the following lines:

```
@#SockPort:IPv4_Runtime.1
TYPE: INT
Desc: Check number of UDP sockets
MSGH:Number of UDP sockets: 4
SOCKPORT_SOCKETS_NUM:4
MSGH:DPK maximum UDP sockets number:
    IDS_DD_DATA_MAX_UDP:"4"- equals
    to device number of UDP sockets (SOCKPORT_SOCKETS_NUM:4)
STATUS:SUCCESS
```

An example of a typical device test log data output file is included in the computer program listing appendix in file: Test_Output_File.txt.

The test data log is then processed in a parser processing program, step 14. The parser processing program extracts the device parameter name-value pair elements and filters out (i.e., discards) private and extraneous information. For example, in the selection of the test data log presented in the previous paragraph, only the line "IDS_DD_DATA_MAX_UDP:4" would be retained. As part of the parsing operations, the parser processing program may also organize and format the data in a manner suitable for use as an input to the simulation. Further description of the operations that may be performed by the parser processing program are described below with reference to FIG. 2. The output of the parser processing program is a simulation input file that contains the device parameter values in a format that can be imported directly into the simulator shell, step 16.

To simulate the operation of an application on a programmable device, a simulator program needs to be assembled to replicate the device. In a typical simulator implementation, a simulator shell program 18 is present on a simulator computer, such as a personal computer, into which is loaded the simulation code 20, the device parameter values file 16, and image files 22 which enabled the simulation to replicate the appearance as well as the functioning look & feel of the device being simulated. The result of this assembly is a computer-based device simulation 24 which will replicate the look and functioning of the programmable device. Finally, to conduct the test the operation of an application, the application is loaded into the simulated device memory within the computer simulation and the application executed and manipulated in a manner that is representative of how the actual device would be operated.

Figure 2:
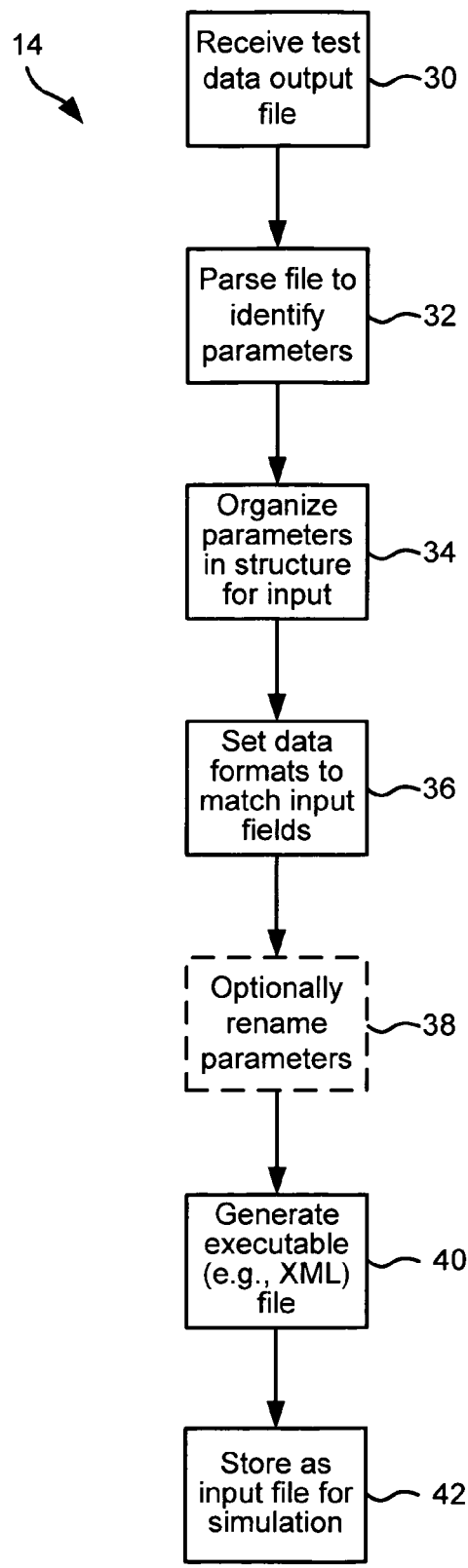
FIG. 2 is a process flow diagram of a method for transforming a device test log file into a suitable simulation input file.

A variety of operations can be performed on the device test data log file in order to present the device parameter values in a proper format and structure for use as an input for the simulation (i.e., as the simulation input file). An embodiment method for processing the test data log file that is output from device testing is illustrated in FIG. 2. The data log file generated in the device testing is received as an input to the process, step 30. The data log file is then parsed to identify the parameter name-value pairs and filter out private and unnecessary information, step 32. The name-value pairs may then be organized into a structure which is compatible with the simulation input requirements. The name-value pairs may also be organized according to a tree-based structure which organizes data in a manner that will make sense to those conducting the simulation. For example, the name-value pairs may be organized around like components or functionality, such as grouping parameters related to the camera function together. Additionally, the data field types will be set to match those required by the simulation, step 36. For example, if the simulator expects a particular parameter to be input as an integer but the data log file presents the value as text, the parser processing program will convert the text field into an integer field, or identify the value as an integer in the simulation input file. In some situations, the parser processing program may also rename the parameter variable names to match those expected by the simulation, optional step 38. This step is optional since the test framework may be configured so that the test data log file uses the same parameter names as expected by the simulation, in which case there will be no need to rename parameters. The parsed and processed name-value pairs may then be converted into an executable file that can be read into the simulator, such as by converting the information into an XML file, step 40. Finally, the executable file is stored in a format that can be used as an input to the simulation, step 42. For example, the input file may be stored in memory for input into a simulation running on the same computer as the parser processing program. As another example, the executable import file may be stored on a tangible storage medium which can be read by a computer conducting the simulation, such as a compact disc or memory of a server a the network coupled to the computer conducting the simulation, step 42. An example of a suitable parser processing program is included in the computer program listing appendix in file: Log_Parser_Code.txt.

The output of the parser processing program is an input file that can be read directly into a device simulator. The simulation input file may be in the form of an XML (or similar) file that provides the device characteristics and parameter data correlated with the parameter names, with the data presented in the proper data format. An example of such a simulation input file is included in the tables presented in the computer program listing appendix in file: Sim_Input_File.txt. As a specific example, the UDP socket number output value of "4" that was presented in the data log file as the line "IDS_DD_DATA_MAX_UDP:4" may be presented in the simulation input file in a format similar to the following:

```
<String Id="15" Name="IDS_DD_DATA_MAX_UDP">
    <Text>4</Text>
</String>
```

This example script will be interpreted in the process of reading the file into the simulation as setting the value for the parameter named IDS_DD_DATA_MAX_UDP equal to "4" in which the number is presented as text. The generation and processing of such XML files may be accomplished using methods well known to those of ordinary skill in the computer programming arts.

To facilitate automatic entry of the simulation input file, the simulator shell may be provided with one or more APIs which can interpret the input file and store the various parameter values into memory in the simulation corresponding to the associated parameter variables.

The foregoing methods may be integrated into an automated process which directly receives device test output data and outputs a simulation input file. In such an automated embodiment, the various steps may be performed within the same processor program or within separate programs which are sequentially initiated. Also, the steps of receiving device test output data, processing the output data to generate a simulation input file, and inputting the simulation input file into a simulation program may be accomplished in two or more computers that are linked by a network or common memory with each of the computers configured to receive, process and transfer data so that the process proceeds automatically.

Figure 3:
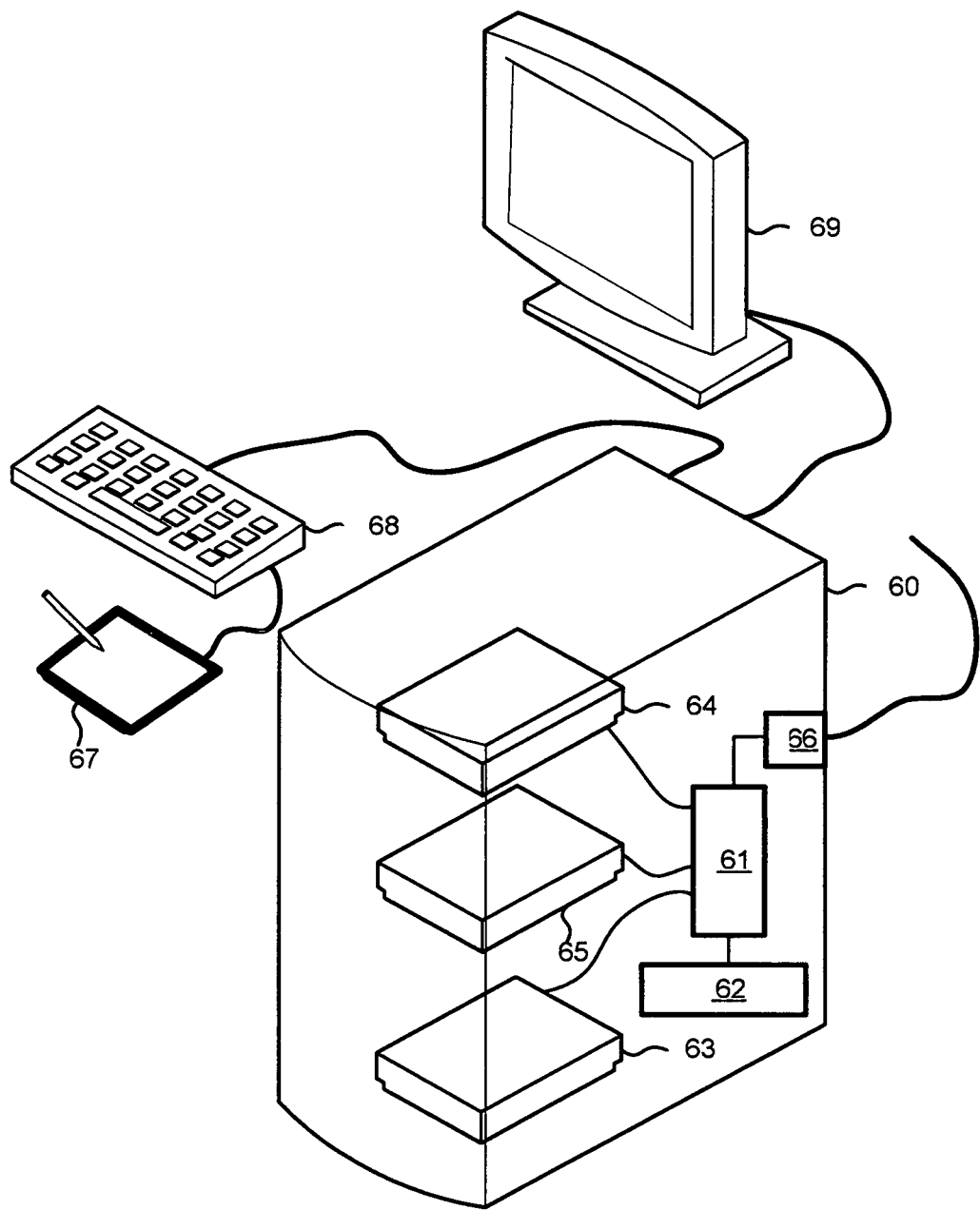
FIG. 3 is a component block diagram of a computer suitable for implementing the various embodiments.

The embodiments described above may also be implemented on any of a variety of computers, such as a personal computer 60 illustrated in FIG. 3. Such a personal computer 60 typically includes a processor 61 coupled to volatile memory 62 and a large capacity nonvolatile memory, such as a disk drive 63. The computer 60 may also include a floppy disc drive 64 and a compact disc (CD) drive 65 coupled to the processor 61. Typically the computer 60 will also include a pointing device such as a mouse 67, a user input device such as a keyboard 68 and a display 69. The computer 60 may also include a number of network connection circuits 66, such as a USB or FireWire®, coupled to the processor 61 for establishing data connections to external devices such as a programmable device being tested. In a notebook configuration, the computer housing includes the pointing device 67, keyboard 68 and the display 69 as is well known in the computer arts.

The embodiments provide a number of benefits to application developers. Reusing device functionality and performance testing data to feed into a computer-based device simulator saves the expense and source of errors associated with manually configuring the simulation with device characteristics. Since the resulting simulation is based on the device outputs, it is more accurate (both in terms of functionality and performance) and more accurately behaves like the real device. The embodiments also allow operators/OEMs to share device information (and any device known issues) accurately and easily with other interested parties. By presenting device outputs in the simulator, the embodiments provide application developers with an accurate preview of the full device functionality before it is available for purchase.

The various embodiments may be implemented by a computer processor 61 executing software instructions configured to implement one or more of the described methods. Such software instructions may be stored in memory 62, 63 as separate applications, or as compiled software implementing an embodiment method. Reference database may be stored within internal memory 62, in hard disc memory 64, on tangible storage medium or on servers accessible via a network (not shown). Further, the software instructions and databases may be stored on any form of tangible processor-readable memory, including: a random access memory 62, hard disc memory 63, a floppy disc (readable in a floppy disc drive 64), a compact disc (readable in a CD drive 65), electrically erasable/programmable read only memory (EEPROM), read only memory (such as FLASH memory), and/or a memory module (not shown) plugged into the computer 60, such as an external memory chip or a USB-connectable external memory (e.g., a "flash drive") plugged into a USB network port 66.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The order in which the steps of a method described above and shown in the figures is for example purposes only as the order of some steps may be changed from that described herein without departing from the spirit and scope of the present invention and the claims.

The steps of a method or algorithm described in connection with the embodiments disclosed herein may be embodied directly in hardware, in a software module of machine-readable instructions executed by a processor, or in a combination of the two. For example, operating portions could be a portable computer, a cellular telephone, a personal digital assistant, or a navigation device. A software module may reside in processor readable memory which may be any of RAM memory, flash memory, ROM memory, EPROM memory, EEPROM memory, registers, hard disk, a removable disk, a CD-ROM, non-volatile storage (e.g., a conventional "hard drive" or a RAID array), magnetic tape, paper "punch" cards, or any other form of storage medium known in the art. Disk and disc, as used herein, includes compact disc (CD), laser disc, optical disc, digital versatile disc (DVD), floppy disk and blu-ray disc where disks usually reproduce data magnetically, while discs reproduce data optically with lasers. An exemplary storage medium is coupled to a processor such that the processor can read information from, and write information to, the storage medium. In the alternative, the storage medium may be integral to the processor. The processor and the storage medium may reside in an ASIC. Additionally, in some aspects, the steps and/or actions of a method or algorithm may reside as one or any combination or set of codes and/or instructions on a machine readable medium and/or computer readable medium, which may be incorporated into a computer program product.

If implemented in software, the functions may be stored on or transmitted over as one or more instructions or code on a computer-readable medium. Computer-readable media includes both computer storage media and communication media including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

We claim:

1. A method for generating a simulation input file for automatically configuring a device simulator from a device test data log file produced during testing of an operating system (OS) on actual device hardware, comprising:
   receiving device test data from the device test data log file comprising raw log data stored in a predefined format;
   parsing the device test data to identify parameter name-value pairs;
   organizing the parameter name-value pairs into a structure compatible with device simulator input requirements;
   setting data field types to match input fields required by the device simulator;
   generating an executable file to be read by the device simulator; and
   storing the executable file as a simulator input file.

2. The method of claim 1, wherein generating the executable file further comprises removing private and unnecessary information.

3. The method of claim 1, further comprising inputting the simulator input file into a simulator shell program operating on a computer.

4. The method of claim 1, further comprising generating the device test data log file so as to include parameter name-value pairs when performing testing operations on actual device hardware.

5. The method of claim 1, wherein the executable file is generated in XML file format.

6. The method of claim 3, wherein the operations of receiving device test data and generating the executable file are accomplished automatically.

7. A computer, comprising:
   a processor;
   a memory coupled to the processor,
   wherein the processor is configured with processor-executable instructions to perform operations for generating a simulation input file for automatically configuring a device simulator from a device test data log file produced during testing of an operating system (OS) on actual device hardware, comprising:
   receiving device test data from the device test data log file comprising raw log data stored in a predefined format;
   parsing the device test data to identify parameter name-value pairs;
   organizing the parameter name-value pairs into a structure compatible with simulation input requirements;
   setting data field types to match input fields required by the simulation;
   generating an executable file to be read by a simulator; and
   storing the executable file as a simulator input file for the simulation.

8. The computer of claim 7, wherein the processor is configured with processor-executable instructions to perform operations such that the operation of generating the executable file further comprises removing private and unnecessary information.

9. The computer of claim 7, wherein the processor is configured with processor-executable instructions to perform further operations comprising inputting the simulator input file into a simulator shell program operating on the computer or another computer connected thereto.

10. The computer of claim 7, wherein the processor is configured with processor-executable instructions to perform operations such that the executable file is generated in XML file format.

11. The computer of claim 9, wherein the processor is configured with processor-executable instructions to perform operations such that all steps are accomplished automatically.

12. A computer for generating a simulation input file for automatically configuring a device simulator from a device test data log file produced during testing of an operating system (OS) on actual device hardware, comprising:
- means for receiving device test data from the device test data log file comprising raw log data stored in a predefined format;
- means for parsing the device test data to identify parameter name-value pairs;
- means for organizing the parameter name-value pairs into a structure compatible with simulation input requirements;
- means for setting data field types to match input fields required by the simulation;
- means for generating an executable file to be read by a simulator; and
- means for storing the executable file as a simulator input file for the simulation.

13. The computer of claim 12, wherein means for generating the executable file further comprises means for removing private and unnecessary information.

14. The computer of claim 12, further comprising means for inputting the simulator input file into a simulator shell program operating on a computer.

15. The computer of claim 12, further comprising means for generating the executable file in XML file format.

16. A non-transitory computer-readable storage medium having stored thereon processor-executable instructions configured to cause a processor of a computer to perform operations for generating a simulation input file for automatically configuring a device simulator from a device test data log file produced during testing of an operating system (OS) on actual device hardware, the operations comprising:
- receiving device test data from the device test data log file comprising raw log data stored in a predefined format;
- parsing the device test data to identify parameter name-value pairs;
- organizing the parameter name-value pairs into a structure compatible with simulation input requirements;
- setting data field types to match input fields required by the simulation;
- generating an executable file to be read by a simulator; and
- storing the executable file as a simulator input file for the simulation.

17. The non-transitory computer-readable storage medium of claim 16, wherein the stored processor-executable instructions are configured to cause a processor of a computer to perform operations further comprising removing private and unnecessary information from the executable file.

18. The non-transitory computer-readable storage medium of claim 16, wherein the stored processor-executable instructions are configured to cause a processor of a computer to perform operations further comprising inputting the simulator input file into a simulator shell program operating on a computer.

19. The non-transitory computer-readable storage medium of claim 16, wherein the stored processor-executable instructions are configured to cause a processor of a computer to perform operations further comprising generating the executable file in XML file format.

20. The non-transitory computer-readable storage medium of claim 16, wherein the stored processor-executable instructions are configured to cause a processor of a computer to perform the operations automatically.

\* \* \* \* \*